United States Patent [19]

Brandenstein et al.

[11] Patent Number: 4,558,768
[45] Date of Patent: Dec. 17, 1985

[54] EXPANDING WEDGE ACTUATION DEVICE

[75] Inventors: Manfred Brandenstein, Eussenheim; Roland Haas, Lendershausen; Rudiger Hans, Niederwerrn, all of Fed. Rep. of Germany

[73] Assignee: SKF Kugelagerfabriken GmbH, Schweinfurt, Fed. Rep. of Germany

[21] Appl. No.: 488,376

[22] Filed: Apr. 25, 1983

[30] Foreign Application Priority Data

Apr. 29, 1982 [DE] Fed. Rep. of Germany ....... 3215904

[51] Int. Cl.$^4$ ............................................ F16D 65/22
[52] U.S. Cl. ...................................... 188/343; 74/110
[58] Field of Search .............. 74/110; 188/106 P, 343, 188/366, 368

[56] References Cited

U.S. PATENT DOCUMENTS 3,511,103 5/1970 Cox .................................. 188/343 X

FOREIGN PATENT DOCUMENTS 102464 8/1979 Japan .................................... 188/343

Primary Examiner—Duane A. Reger
Attorney, Agent, or Firm—Eugene E. Renz, Jr.

[57] ABSTRACT

A wedge assembly particularly adapted for expanding brakes of motor vehicles including a housing and at least a pair of push rods movably supported in the housing and operatively connected to brake shoes of the brake, the push rods having confronting oppositely inclined faces comprising a wedge member having a pair of oppositely inclined wedge faces complementing the inclined faces of the push rods and at least a roller engaging between the inclined faces of said wedge member and push rods, and a cage for guiding said rollers slidingly movable in a longitudinal direction on said expansion wedge member, said cage having two flank portions extending parallel to the transverse direction having two free flank ends reciprocally directed in the transverse direction and provided with guide means for the rollers, each of said rollers having smooth axial end faces blending at their circumferential edge into a rolling face and said guide means being formed by two radial guide sections on each flank end of the roller cage disposed opposite each other in a longitudinal direction and firmly gripping the outer edge of the roller.

9 Claims, 7 Drawing Figures

EXPANDING WEDGE ACTUATION DEVICE

BACKGROUND OF THE INVENTION

1. Field Of The Invention

The present invention relates to a wedge-type expansion assembly particularly adapted for expanding brake shoes of brake assemblies in motor vehicles.

2. Description Of The Prior Art

Wedge-type expansion devices of the general type to which the present invention relates are previously known as, for example, shown in German Pat. No. 2,356,075. This patent shows a device wherein the two ends of the rollers of the roller cage are provided with a guide trunnion projecting over the front face of the roller. The guide trunnions engage in an axially continuous opening in a flank of the roller cage. This prior known device has several disadvantages and drawbacks in that the guide trunnions of the rollers have a relatively small radial guide face and therefore, when subjected to heavy stress in operation, are subject to damage by sliding wear. A further disadvantage results by reason of the fact that rollers provided with guide trunnions are difficult to produce since the guide trunnions must be shaped precisely concentrically with the active rolling face of the roller. It has been found that when the rollers are hardened, harmful internal stresses and hardening cracks are often produced at the transition of the front face of the roller and the guide trunnion. Additionally, the radial bearing capacity of the rollers is also limited since the active length of the rolling face of the rollers is reduced in size by the axial extension of the two-guide trunnions. Further, these prior known expansion wedge devices for expanding brakes of motor vehicles, the construction space for accommodating large bearings capable of withstanding the loads, cannot always be provided.

SUMMARY OF THE INVENTION

With the foregoing in mind, it is an object of the present invention to provide an improved expanding wedge actuation assembly of the above type which is characterized by novel features of construction and arrangement which is compact in construction, has a long, useful life even at high stress, and which can be manufactured easily and economically. To this end, the assembly includes a wedge member having a pair of oppositely inclined wedge faces actuatable in a predetermined transverse direction to effect actuation of a pair of push rods having complementary oppositely inclined faces which in turn are operatively associated with the brake shoes of an expanding brake assembly of a motor vehicle through rollers guided in a roller cage which are slidingly movable in a longitudinal direction on the expanding wedge and between the inclined side faces of each push rod. The roller cage is provided with two flanks which run parallel to the transverse direction which each have two free flank ends reciprocally directed in a transverse direction and formed with guide means for the rollers. The rollers have smooth axial end faces blending at their outer circumferential edge into the rolling face and the guide means are formed by two radial guide sections on each flank end which are disposed opposite each other in a longitudinal direction and tightly grip the outer edge of the rollers. The expanding wedge actuation assembly of the present invention utilizes conventional rollers which can be economically mass produced and wherein the rollers are axially guided at their outer edge and consequently, safeguarded against harmful skew positioning in the roller cage.

In accordance with a feature of the present invention, the guide means are formed to guide sections disposed opposite one another in a longitudinal direction and an axial guide section on each flank end of the roller cage which slidingly engages the area of the axial end face of the roller adjacent the inclined wedge face of the expanding wedge member. This arrangement provides an axial guiding of the two rollers of the assembly on each side and three locations at their periphery. In the exemplified embodiment, the radial guide sections of each flank end of the roller cage extend in a transverse direction beyond the height of the axis of rotation of the roller at its farthest outward adjusted position and in this manner provide the advantage that the rollers and cage and expanding wedge form a self-locking unit since both rollers are radially embraced from the outside by the radial guide sections and, therefore, prevented from falling from the roller cage.

In accordance with another feature of the present invention, each radial guide section has a longitudinally directed outer wall which combined with the adjacent front face of the roller is located in a common plane parallel to the transverse direction of actuation and arranged slidingly movable in a longitudinal direction with respect to the side face of the push rod. In this manner, the axial length of the rolling face of each roller may be made about as large as the reciprocal distance of the two side faces of the associated push rod and in this way produce maximum rolling contact between the roller and the inclined face of the push rod.

A further feature of the present invention is that the wedge face of the expanding wedge member has an active width extending at right angles to the transverse direction coextensive in length with the rolling face of the rollers so that the rollers engage over their entire length producing a high bearing capacity in the contact zone between the rollers and the expanding wedge.

The cage may be made, for example, of strip material without cutting so that the flank ends of the roller cage are thin-walled so that the radial guide sections of each flank end may be bent inwards at their connecting location with the associated flank end as a result of plastic deformation and thereby tightly grip the outer edge of the rollers.

In accordance with another feature, the outer edges of each roller are formed by side reducing face between the front face and the rolling face, and the two radial guide sections of each flank end are arranged.

In accordance with still another feature of the present invention, the axial guide face of each flank end of the roller cage smoothly blends into the direction of the wedge face of the expanding wedge member into an inside wall of the flank which slidingly guides the wedge member in a longitudinal direction. By this construction, the roller cage is extremely economical to manufacture and can be bent in box-like fashion around the expanding wedge for assembly purposes. The radial guide sections of each flank end are of essentially the same distance from the inclined face of the opposite push rod and this allows a sliding guiding of the roller cage at its two guide sections with relatively large active contact faces of the radial guide sections on the side faces of the push rod.

BRIEF DESCRIPTION OF THE DRAWINGS

These and other objects of the present invention and the various features and details of the operation and construction thereof are hereinafter more fully set forth with reference to the drawings, wherein.

DESCRIPTION OF THE PREFERRED EMBODIMENTS

Figure 1:
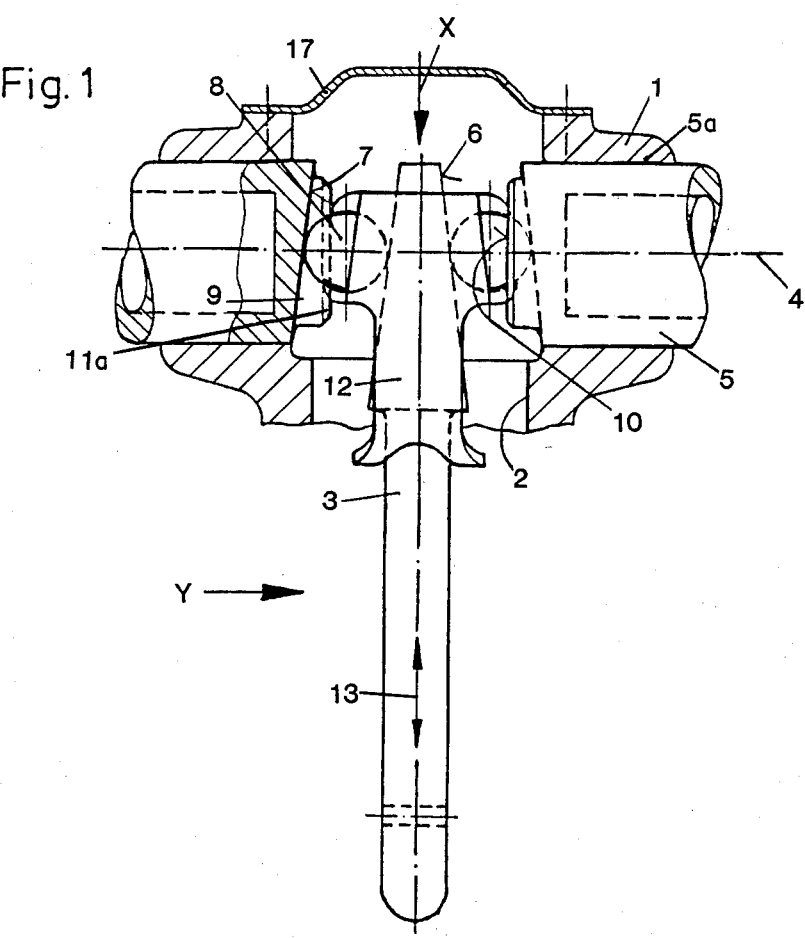
FIG. 1 is a transverse longitudinal sectional view through an expansion wedge assembly for brake shoes in accordance with the present invention.
Figure 2:
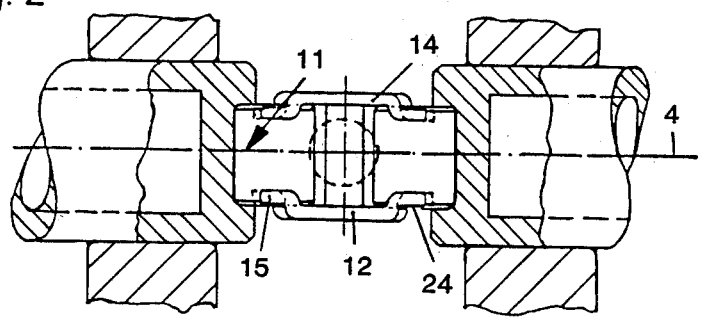
FIG. 2 is a top plan view partly in section as viewed in the direction of the arrow X in FIG. 1.
Figure 6:
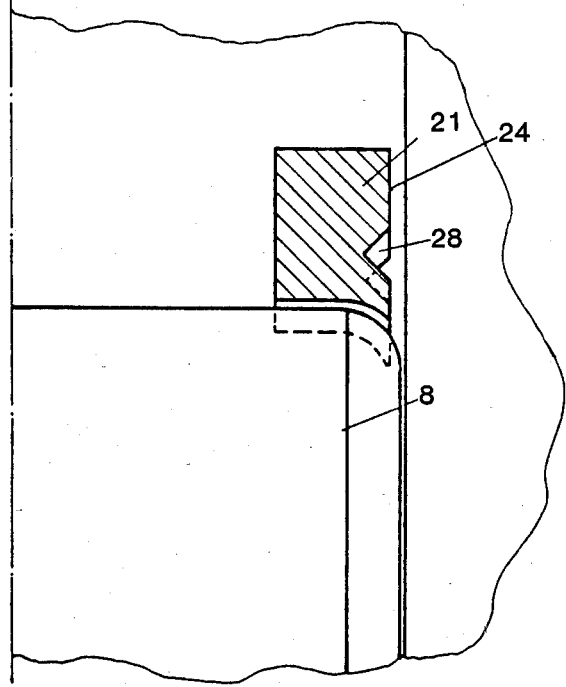
FIG. 6 is a fragmentary partial cross sectional view taken along lines B—B of FIG. 4.

Referring now to the drawings, and particularly to FIGS. 1 and 2 thereof, there is illustrated an expansion wedge in accordance with the present invention adapted for actuating push rods operatively associated with the brake shoes of expanding brakes for motor vehicles. The structural details and arrangement of the brake assembly are generally conventional and include a housing 1 and a pair of cylindrical push rods 5 which are operatively connected to the shoes of the brake assembly and are slideably movable in aligned bores in the bores 5a in the housing in the direction generally indicated by the numeral 4. Note that the axes of the push rods 5 are aligned with each other in the transverse direction 4.

In accordance with the present invention, the wedge assembly operates to effect actuation of the push rods in a transverse direction toward and away from one another by movement of the wedge assembly in a predetermined longitudinal direction. To this end, the expansion wedge assembly comprises as illustrated in FIGS. 1 and 2, a wedge member 3 having a pair of opposed inclined wedge faces 6 which complement and are generally parallel to confronting inclined faces 7 of the push rods 5. In the present instance, a pair of rollers 8 is disposed between the inclined surfaces 6 and 7. As illustrated, the inclined face 7 of each push rod 5 is defined by the base of a longitudinal groove 11 formed, for example, by machining in a radially inwardly directed flat front face 10 of the push rod 5. The two opposite side walls 11a of the longitudinal groove 11 form opposing side faces 9 for the rollers.

Figure 3:
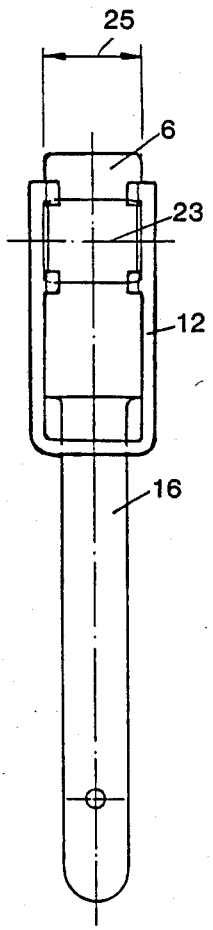
FIG. 3 is a side elevational view of the expanding wedge member, roller cage and rollers as viewed in the direction of the arrow Y.

The rollers 8 of the expansion wedge assembly are guided in a roller cage 12 which is mounted for sliding movement in a longitudinal direction indicated by the arrow 13 and between the two opposing side faces 9 of each push rod 5. The flat front face 10 of the push rods 5 in the present instance, runs parallel to the longitudinal direction 13 and perpendicularly to the transverse direction 4. As illustrated, the roller cage 12 has two flanks 14 running parallel to the transverse direction 4 and each flank 14 has two free flank ends 15 reciprocally directed in a transverse direction 4 and provided with guide means for the roller 8. As illustrated in FIG. 3, the roller cage 12 is of generally U-shaped cross section and encloses the upper end of the expansion wedge assembly 3. The wedge member 3 as illustrated, has an elongated actuating arm 16 which engages outward through an opening in the lower portion of the cage 12. The housing bore 2 for the expansion assembly is closed off at its upper outer end by a housing cover 17 suitably fastened to the housing by means of screw members of the like (not shown). In the present instance, the rollers 8 of the expansion wedge assembly are cylindrical rollers having at their opposite axial ends a continous smooth front face 20 blending into the cylindrical rolling face 19 at the outer circumferential edge 18.

Figure 4:
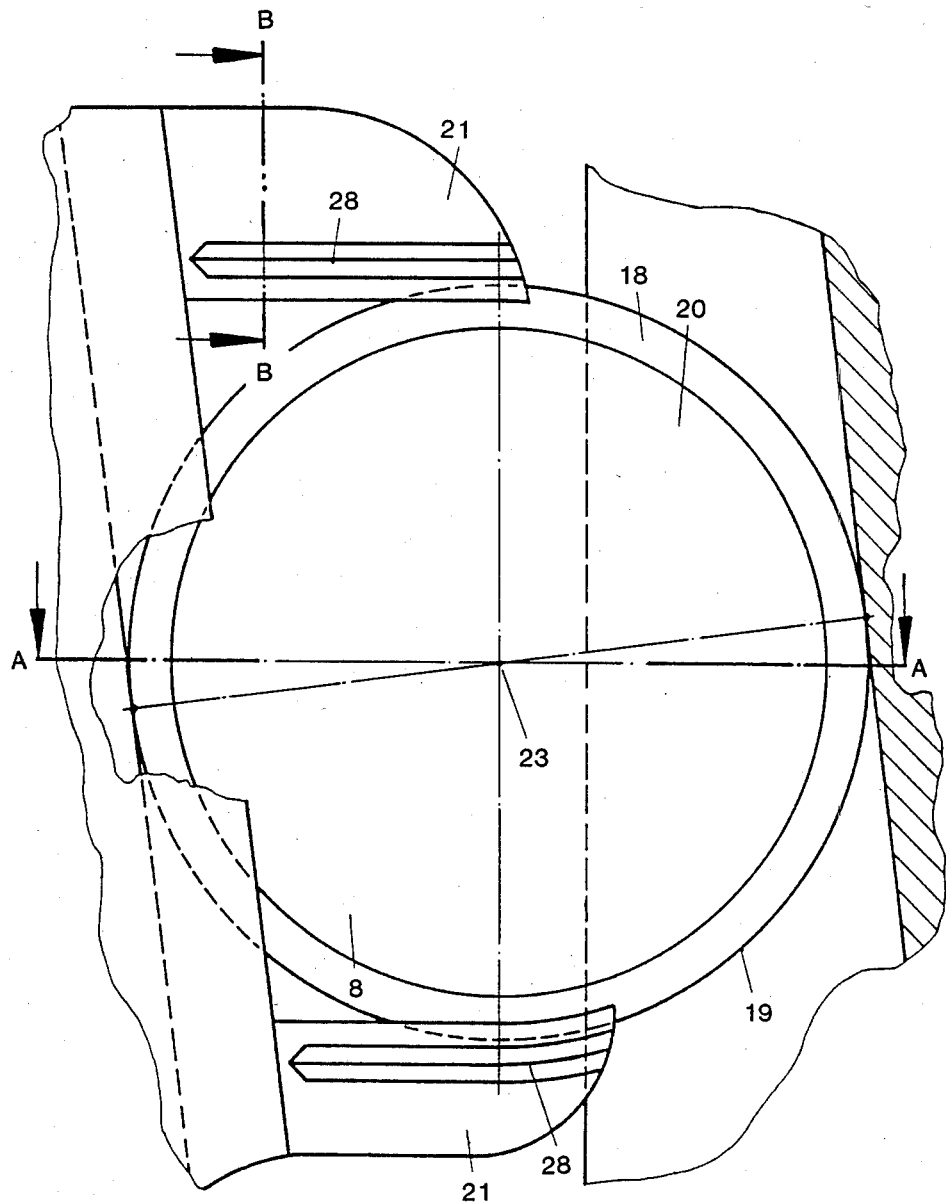
FIG. 4 is an enlarged view of the front face of the roller installed in an expansion wedge assembly device as of the type shown in FIG. 1.
Figure 5:
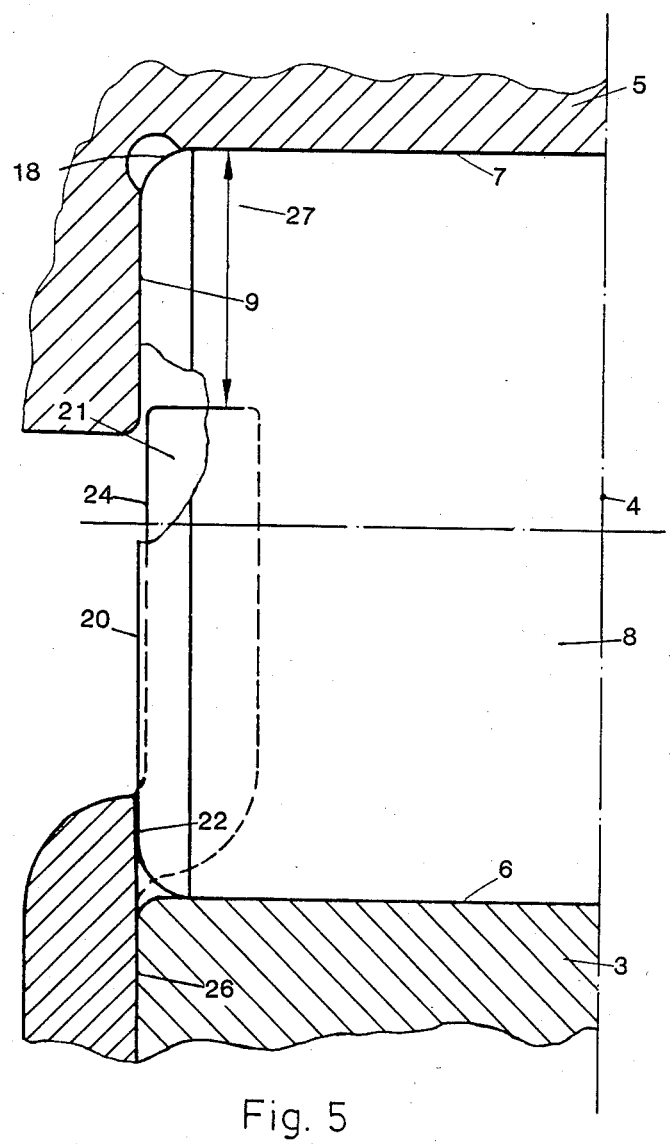
FIG. 5 is a fragmentary cross sectional view taken along the lines A—A of FIG. 4.

As illustrated in FIGS. 4 and 5 the guide means for the rollers 8 is formed by two radial guide sections 21 located opposite each other in a longitudinal direction which tightly embrace the outer edge 18 of the roller and an axially extending guide section 22 on each flank end 15 of the roller cage which slidingly engages the front face 20 of the roller. The front face 20 of the roller 8 is slidingly guided in the area adjacent the wedge face 6 of the expanding wedge member 3. The two radial guide sections 21 extend in a transverse direction 4 beyond the height of the axis of rotation 23 of the roller 8 even when the roller is located in its fartherest outward position in the transverse direction 4. The outer longitudinally directed sidewall 24 of the radial guide sections 21 of each flank end 15 is generally aligned with the front face 20 of the roller 8 in the same parallel plane in relation to the transverse direction 4 as illustrated in FIG. 5. Further, the two radial guide sections 21 are guided in a longitudinal direction 13 and are slidingly movable on the adjacent side 9 of the push rod 5. The front faces 20 of each roller 8 are also held laterally between the two side faces 9 of the push rod 5.

In the present instance, the flank ends 15 of the roller cage 12 are made of a thin-walled sheet metal and in order to tightly grip the outer edge 18 of the roller 8, the two radial guide sections are reciprocally bent inwardly towards each other at their connecting location with the associated flank end 15 as a result of plastic deformation, that is, in the direction of the axis of rotation 23 of the roller 8.

As best illustrated in FIG. 5, the peripheral edges of each roller at the juncture of flat axial front end face 20 and the cylindrical rolling face 19 are formed by a peripheral side reducing face of convex cross sectional shape. Both wedge faces 6 of the expanding wedge 3 are of a width 25 extending at right angles to the transverse direction 4 and are of the same length as the length of the rolling face 19 of the roller 8 as shown in FIG. 3.

The roller cage is of a predetermined configuration to support the rollers against displacement in an axial and longitudinal direction. To this end, the radial guide sections 21 of each flank end 15 grip the outer edge 18 of the roller 8 with their faces confronting the roller so that the roller is axially held in place in the roller cage 12 and the edge faces of the two radial guide sections 21 also cover an adjacent area of the rolling face 19 so that the roller is also held in place in the roller cage in the longitudinal direction 13.

Considering other details of the assembly, the axial guide face 22 of each flank end 15 of the roller cage 12 blends smoothly in the direction of the wedge face 6 of the expanding wedge 3 into an inside wall 26 of the flank 14 thereby guiding the expanding wedge in the longitudinal directions 13. In the present instance, the wall 26 is constructed as a flat face as illustrated in FIG. 5. The radial guide sections 21 of each flank end 15 have the same distance 27 from the inclined face 7 of the opposite push rod 5. This distance 27 is relatively small so that a uniformly large contact face of the outer wall 24 is formed at the opposite side face 9 of the push rod 5. The inwardly directed front face of the push rod 5 runs parallel to the opposite wedge face 6 of the expanding wedge 3.

A V-shaped cross section of groove 28 is formed in the outer wall 24 of each radial guide section 21 to displace the construction material towards the roller 8, the groove being impressed near the edge on the side of the roller so that the radial guide sections generally conform to the contour of the roller at the peripheral edge thereof at the juncture of the axial end face and the rolling surface 19. An edge-face is formed in this way on each radial guide section 21 tightly gripping the outer edge of the roller 8. Therefore, since the two radial guide sections 21 of each flank 15 are arranged in transverse direction 4 always extending beyond the height of the axis rotation 23 of the roller 8. This arrangement provides a self locking unit comprised of the expanding wedge, the two rollers, and the roller cage with the rollers confined therein.

Figure 7:
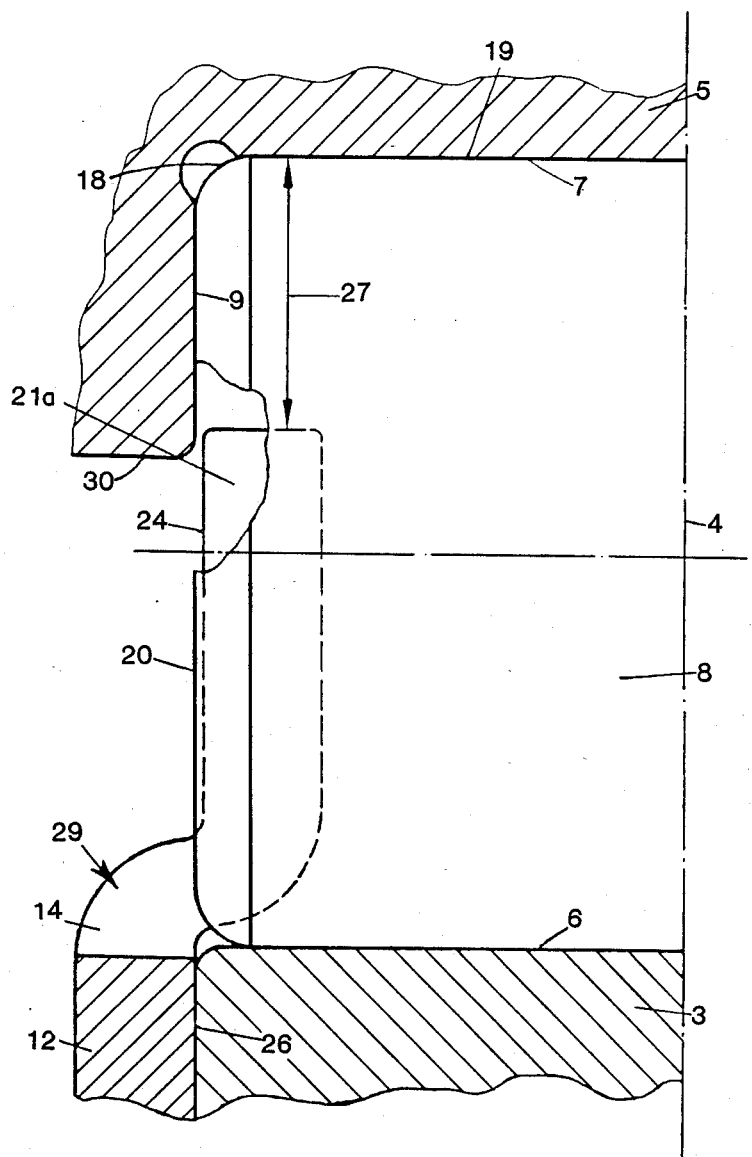
FIG. 7 is a fragmentary sectional view of a modified expansion wedge in accordance with the present invention.

There is illustrated in FIG. 7 a modified expanding wedge actuation assembly generally similar in construction to the assembly shown in FIGS. 1–6 inclusive described above. Thus, the pair of rollers 8 also has at their opposite axial ends a planar axial end face 20 which blends into the rolling face 19 of the roller. In the present instance, however, the guide means of the roller cage flanks are formed by only two radial guide sections 21a at each flank end 15 of the roller cage 12. These guide sections are located opposite each other in longitudinal direction and tightly support or grip the outer edge 18 of the roller 8. This arrangement provides an intermediate space 29 extending to the wall 6 between the flanks 14 of the roller cage on each side of the roller 8 which thereby frees the related front face of the roller 8 in the area adjacent the wedge face 6. Further, in the present instance, the flat front face 30 of the push rods extend parallel to the inclined face 7 of the base of the longitudinal groove of the push rod 5, that is oblique to the longitudinal direction of the actuating movement of the expanding wedge 3.

While particular embodiments of the present invention have been illustrated and described herein, it is not intended to limit the invention and changes and modifications may be made therein within the scope of the following claims and the concept of the present invention. For example, it is not necessary to machine the side faces for the rollers of the expansion wedge assembly in the push rods. There may rather be arranged in the housing and the inwardly directed front face of the push rod may then be constructed as a smooth flat faced inclined face for engagement with the rollers. Additionally, the end of the roller cage 12 directed away from the actuation extension 16 may be closed off by a wall to provide a structurally sound expansion roller cage thereby to strengthen the roller cage 12. In this instance, an opening to accommodate the end of the expansion wedge 3 may be formed or machined in this wall. Additionally, the two flanks 14 of the roller cage 12 may also be connected with one another by a wall at their outer edge and directed towards the associated push rod 5 near the actuation extension 16 so that the roller cage 12 is of a box-like configuration cross section and has a particularly high deformation strength.

SUMMARY

The expanding wedge actuation device consists of a housing 1 for receiving an expanding wedge 3 extending into a housing bore 2, which can be actuated in longitudinal direction and of two push rods 5 supported movably in the housing 1 actuating the brake shoes as a result of reciprocal displacement in a certain transverse direction 4. Each time one roller is arranged adherence actuated between one of the two wedge faces 6 of the expanding wedge 3 and one of their complementary opposite incline faces 7 of the push rod 5. Both rollers are guided in a roller cage 12 which in turn is arranged slidingly movable on the expanding wedge 3 and between two side faces 9 of each push rod 5 or of the housing 1.

The two rollers 8 each have on both their ends a smooth front face 20 blending at their outer edge 18 into the rolling face 19 of the roller 8 so that the expanding wedge actuation device at a higher possible stress has a space conserving construction. The guide means are formed by two radial guide sections 21 of the roller cage 12, which are found opposite each other in longitudinal direction 13 and tightly grip the outer edge 18 of the roller 8.

What is claimed is:

1. A wedge assembly particularly adapted for expanding brakes of motor vehicles including a housing and at least a pair of push rods movably supported in the housing and operatively connected to brake shoes of the brake, the push rods having confronting oppositely inclined faces comprising a wedge member having a pair of oppositely inclined wedge faces complementing the inclined faces of the push rods and at least a roller engaging between the inclined faces of said wedge member and push rods, and a cage for guiding said rollers slidingly movable in a longitudinal direction on said expansion wedge member, said cage having two rigid flank portions (14) integral and common to the rollers and extending parallel to the transverse direction having two free flank ends reciprocally directed in the transverse direction and provided with guide means for the rollers, each of said rollers having smooth axial end faces blending at their circumferential edge into a rolling face and said guide means being formed by two radial guide sections (21) disposed opposite each other in longitudinal direction (13), and each radial guide section (21) conforming generally to the contour of the roller at the peripheral edge juncture of the axial end face and cylindrical rolling surface to define an edge face gripping the outer edge of the roller, said edge face extending beyond the length of the roller displacement in a transverse direction to provide a self-locking unit comprising the wedge, rollers and cage, and an axial guide section (22) on each flank end (15) of the roller cage (12) slidingly engaging the area of the related front face (20) of the roller (8) adjacent to the wedge face (6) of the expanding wedge member (3), said guide means permitting movement of said rollers related to the cage in a transverse direction.

2. A wedge assembly as claimed in claim 1 characterized in that the two radial guide sections (21) of each flank end (15) of the roller cage (12) are arranged to extend in transverse direction (4) beyond the height of the axis of rotation (23) of the roller (8) in its farthest outward adjusted position.

3. A wedge assembly as claimed in claim 1, characterized in that the two radial guide sections (21) of each flank end (15) of the roller cage (12) have a longitudinally directed outer defining wall (24) which together with the adjacent front face (20) of the roller (8) is located in generally the same plane, parallel to the transverse direction (4) and arranged slidingly movable in a longitudinal direction (13) on the related side face (9) of the push rod (5).

4. A wedge assembly as claimed in claim 1, characterized in that the wedge faces (6) of the expanding wedge member (3) have an active width (25) extending at a right angle to the transverse direction (4), which has the same size as the length of the rolling face (19) of the associated roller (8).

5. A wedge assembly as claimed in claim 1, characterized in that the flank ends (15) of the roller cage (12) are relatively thin-walled and the two radial guide sections (21) of each flank end (15) are reciprocally bent inward towards each other at their connecting location with the associated flank end (15) as a result of plastic deformation in order to tightly grip the outer edge (18) of the related roller (8).

6. A wedge assembly as claimed in claim 1, characterized in that the two outer edges (18) of each roller (8) are formed by a side-reducing face between the front fact (20) and the rolling face (19) of the roller (8) and the two radial guide sections (21) of each flank end (15) are arranged tightly gripping the outer edge (18) of the roller (8) and an adjacent area of the rolling face (19).

7. A wedge assembly as claimed in claim 1, characterized in that the axial guide face (22) of each flank end (15) of the roller cage (12) smoothly blends in the direction of the wedge face (6) of the expanding wedge member (3) into an inside wall (26) of the flank (14) slidingly guiding the expanding wedge (3) in longitudinal direction.

8. A wedge assembly as claimed in claim 1, characterized in that the two radial guide sections (21) of each flank end (15) are disposed at the same distance (27) from the inclined face (7) of the opposite push rod (5).

9. A wedge assembly as claimed in claim 1, characterized in that the inclined face (7) of each push rod (5) is formed by the base and the two side faces (9) of two side walls located opposite each other of a longitudinal groove (11) formed in an inward directed fron face (10) of the push rod (5).

* * * * *